United States Patent [19]

Klassen

[11] Patent Number: 5,325,477
[45] Date of Patent: Jun. 28, 1994

[54] METHOD AND APPARATUS FOR GENERATING AND DISPLAYING FREEFORM STROKES

[75] Inventor: Robert V. Klassen, Webster, N.Y.

[73] Assignee: Xerox Corporation, Stamford, Conn.

[21] Appl. No.: 801,291

[22] Filed: Dec. 2, 1991

[51] Int. Cl.$^5$ .............................................. G06F 15/62
[52] U.S. Cl. .................................... 395/142; 395/141
[58] Field of Search ............... 395/142, 140, 141, 143; 340/747, 750, 728; 345/14, 15, 16, 17

[56] References Cited

U.S. PATENT DOCUMENTS

| | | | |
|---|---|---|---|
| 4,620,287 | 10/1986 | Yam | 364/518 |
| 4,674,058 | 6/1987 | Lindbloom et al. | 364/518 |
| 4,855,935 | 8/1989 | Lien et al. | 364/521 |
| 4,912,659 | 3/1990 | Liang | 364/521 |
| 4,933,889 | 6/1990 | Meshkat et al. | 364/578 |
| 4,943,935 | 7/1990 | Sato | 364/518 |
| 5,113,491 | 5/1992 | Yamazaki | 395/141 |
| 5,212,769 | 5/1993 | Pong | 395/150 |

OTHER PUBLICATIONS

Chua, Y. S., "Bezier Brushstrokes," *Computer-Aided Design*, vol. 22, No. 9, Nov. 1990, pp. 550–556.
Pham, B., "Expressive Brush Strokes," *CVGIP: Graphical Models and Image Processing*, vol. 53, No. 1, Jan. 1991, pp. 1–6.
S-L Lien et al., "Adaptive Forward Differencing for Rendering Curves and Surfaces," *Computer Graphics*, vol. 21, No. 4, Jul. 1987.
R. Klassen, "Integer Forward Differencing of Cubic Polynomials: Analysis and Algorithms," *ACM Transactions on Graphics*, vol. 10, No. 2, Jul. 1987, pp. 152–181.

*Primary Examiner*—Phu K. Nguyen
*Attorney, Agent, or Firm*—Finnegan, Henderson, Farabow, Garrett & Dunner

[57] ABSTRACT

A method and apparatus for generating and displaying points along a centerline curve and right and left offset curves of a freeform stroke, wherein the distances from the centerline curve to the right and left offset curves vary in the same parameter as the horizontal and vertical coordinates of the centerline curve. Preferably, the centerline curve is a spline curve and the points along the centerline curve are generated using a subdivision technique in accordance with predetermined termination criteria.

14 Claims, 9 Drawing Sheets

$o(t) = p(t) + n(t)w(t)$

METHOD AND APPARATUS FOR GENERATING AND DISPLAYING FREEFORM STROKES

BACKGROUND OF THE INVENTION

1. Field of the Invention

The present invention relates to a method and apparatus for generating and displaying freeform strokes and, more specifically, to a method and apparatus for generating and displaying points along a centerline curve and right and left offset curves of a freeform stroke, wherein the width of the centerline curve varies in the same parameter as the horizontal and vertical coordinates of the centerline curve.

2. Description of the Related Art

Freeform curves have useful applications in, for example, computer aided design and manufacturing systems, computer graphics, graphic arts, and typesetting for creating both uniform and variable-width curves. Furthermore, various methods and apparatus exist for presenting graphical representations of such freeform curves. For example, U.S. Pat. No. 4,933,889 issued to Meshkat et al. discloses a method for generating finite elements for representing the shape of an object.

In particular, spline curves have been studied extensively, and are in general use in computer graphics (see generally, Bartels, R. H. et al., *An Introduction to Splines for Use in Computer Graphics and Geometric Modeling*, Morgan Kauffman Publishers, Los Altos, Calif., 1987; Farin, G., *Curves and Surfaces for Computer Aided Geometric Design*, Academic Press, San Diego, Calif., 1988).

Spline curves have also been used in computer graphics to generate and display freeform strokes of both constant and varying width in addition to curves, which have no width. For example, Chua, Y. S., *Bezier Brushstrokes*, Computer-Aided Design, Butterworth-Heinemann, Vol. 22, No. 9 (November 1990), pp. 550-55, 604 ("the Chua article"), discloses a technique for using Bezier curves to mathematically model brushstrokes. The Chua article teaches using Bezier functions to model various attributes of a brushstroke, e.g., variations of shape or outline of the brushstroke, shade or color variation along and across the brushstroke, and some effects due to the variation of moisture content of the brush as well as paper characteristics. The Chua article defines a brushstroke by at least one brush segment, the shape (or outline) of which is modeled with two cubic Bezier curves (called "Bezier segments"). Each Bezier segment is associated with a parameter u, called the "parameter along the brush segment," with $u=0$ at the beginnings of the segments and $u=1$ at the ends of the segments. The shape of a general brushstroke can be modeled using one or more brush segments.

As another example, U.S. Pat. No. 4,912,659 issued to Liang et al. discloses a pipeline and parallel processing system for generating surface patches for both wireframe and solid/shaded models in a raster graphics display, wherein the inputs to a transformation processor are the parameters for a rational Bezier surface.

Offset curves have also received considerable attention, primarily in the CAD community (see generally, Farin, G., *Curvature Continuity and Offsets for Piecewise Conics*, TOG 8, 2 (April 1989), pp. 89-99; Farouki, R., and Neff, C., *Algebraic Properties of Plane Offset Curves*, CAGD, p. 297-299; Farouki, R., and Neff, C., *Analytic Properties of Plane Offset Curves*, CAGD, pp 297-299; Hoschek, J., *Spline Approximation of Offset Curves*, CAGD 5 (1988), pp. 33-40; Klass, R., *An Offset Spline Approximation for Plane Curves*, CAD 15, 5 (September 1983), pp. 297-299). Various definitions of offset curves exist. The predominant definition, however, is one based on a centerline or "generator" curve with an offset a distance w defined along a unit normal to each point of the centerline curve. In the absence of a sign convention for the unit normal, an offset curve is defined on both sides of the centerline curve. Generally, the term "left offset curve" designates the offset curve based upon a unit normal given by a positive sign, while the term "right offset curve" designates the offset curve based upon a unit normal by the negative sign. Further, the term "offset curve" is used to refer to one or the other of the left and right offset curves, while the term "offset curve pair" indicates both the left and right offset curves.

While the increased generality of offset curves makes them a more powerful means of expressing curves and surfaces as compared to other conventional techniques, their use has generally been restricted to applications for which they are natural. For example, offset surfaces are used to describe tolerance zones (see, e.g., Hoschek, J., *Spline Approximation of Offset Curves*, CAGD 5 (1988), pp. 33-40), outside surfaces of materials for which the inner surface is the reference (see, e.g., Hoschek, J., *Spline Approximation of Offset Curves*, CAGD 5 (1988), pp. 33-40; Klass, R., *An Offset Spline Approximation for Plane Curves*, CAD 15, 5 (September 1983), pp. 297-299), and machine-tool paths (see, e.g., Farouki, R., and Neff, C., *Analytic Properties of Plane Offset Curves*, CAGD, pp. 297-299).

The majority of applications of offset curves are motivated by physical problems involving constant width offset curves. Because constant width offset curves of spline curves are not spline curves (they are generally non-algebraic), most attention has been given to the efficient approximation of offsets with algebraic (usually rational or non-rational spline) curves. More generally, however, offset curves may have variable widths.

For example, U.S. Pat. No. 4,620,287 issued to Yam ("Yam") discloses a method and apparatus for representing uniform width curves, i.e., strokes having uniform widths. In particular, Yam discloses a technique wherein a curve is approximated by a series of Bezier curves. Each Bezier curve is provided with a predetermined width defined by a corresponding rectangle having the predetermined width. The ends of each of the rectangles are smoothed and rounded so that adjacent rectangles approximate a curve having a constant width.

As another example, Pham, B., *Expressive Brushstrokes*, CVGIP: Graphical Models and Image Processing, Vol. 53, No. 1 (January 1991), pp. 1-6 ("the Pham article"), discloses a technique for modeling brush strokes based on variable offset approximations of uniform cubic B-splines. An operator specifies a set of points, or knots, on a curve representing a brush stroke. Using an inversion algorithm, control vertices of a cubic B-spline are obtained to construct a cubic B-spline through the knots. Next, given an offset distance for each of the knots of the original curve, corresponding offset knots are obtained. The offset distances are measured from the corresponding knot of the original curve in a direction normal to the curve. Finally, using the inversion algorithm, offset control vertices are obtained from the offset knots to construct an offset cubic B-spline curve through the offset knots.

SUMMARY OF THE INVENTION

It is an object of the present invention to provide a new and useful method and apparatus for generating and displaying freeform strokes from a centerline curve and right and left offset curves. In particular, the present invention provides a new and useful method and apparatus for generating and displaying points along the centerline curve and the right and left offset curves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a method of generating and displaying a freeform stroke is provided, the method being performed by a data processing system having a memory and a display, and the method comprising the steps of generating, in the memory, points along a centerline curve of the freeform stroke, the centerline curve varying as a function of a parameter t, and each of the points along the centerline curve; being associated with a horizontal coordinate defined by a function x(t), a vertical coordinate defined by a function y(t), and a width defined by a function w(t); generating a normal vector associated with each of the points along the centerline curve; generating, in the memory, points along a right offset curve and a left offset curve for corresponding ones of the points along the centerline curve, the right and left offset curves varying as a function of the parameter t, and each of the points along the right and left offset curves being associated with a horizontal coordinate and a vertical coordinate generated in accordance with the horizontal coordinate, vertical coordinate, width, and normal vector associated with the corresponding point along the centerline curve; and displaying, on the display, graphical representations of the points along the right and left offset curves to display an outer boundary of the freeform stroke.

Also in accordance with the purposes of the invention as embodied and broadly described herein, an apparatus for generating and displaying a freeform stroke is provided, the apparatus comprising a circuit for generating points along a centerline curve of the freeform stroke, the centerline curve varying as a function of a parameter t, and each of the points along the centerline curve being associated with a horizontal coordinate defined by a function x(t), a vertical coordinate defined by a function y(t), and a width defined by a function w(t); a circuit for generating a normal vector associated with each of the points along the centerline curve, a circuit for generating points along a right offset curve and a left offset curve for corresponding ones of the points along the centerline curve, the right and left offset curves varying as a function of the parameter t, and each of the points along the right and left offset curves being associated with a horizontal coordinate and a vertical coordinate generated in accordance with the horizontal coordinate, vertical coordinate, width, and normal vector associated with the corresponding point along the centerline curve; and a display for displaying graphical representations of the points along the right and left offset curves to display an outer boundary of the freeform stroke.

In a preferred embodiment, the centerline curve is a spline curve and the points along the centerline curve are generated using a subdivision technique in accordance with predetermined termination criteria.

BRIEF DESCRIPTION OF THE DRAWINGS

The accompanying drawings, which are incorporated in and constitute a part of the specification, illustrate presently preferred embodiments of the invention and, together with the general description given above and the detailed description of the method given below, serve to explain the principles of the invention. In the drawings.

DESCRIPTION OF THE PREFERRED EMBODIMENTS AND METHOD

Figure 1:
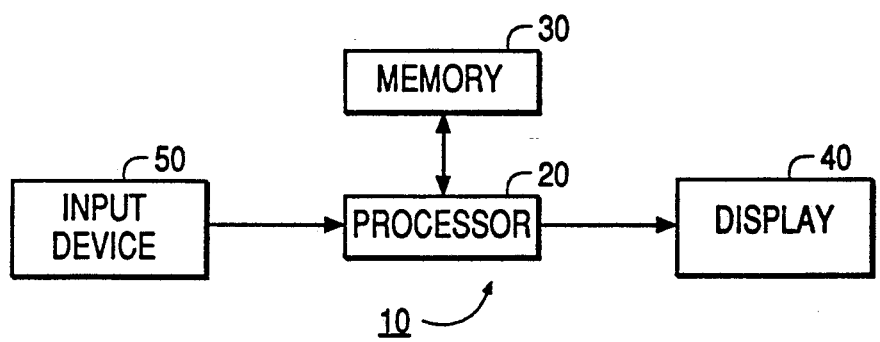
FIG. 1 is a block diagram illustrating a data processing system for generating and displaying a freeform curve in accordance with the present invention.

Reference will now be made in detail to the presently preferred embodiments of the invention as illustrated in the accompanying drawings, in which like reference characters designate like or corresponding parts throughout the several drawings.

As shown in FIG. 1, there is provided a data processing system 10 for generating and displaying a freeform stroke. The data processing system 10 comprises a processor 20 connected to a memory 30, a display 40, and an input device 50.

The input device 50 comprises, for example, any of a keyboard, mouse, touchscreen panel, and digitizer for enabling an operator of the data processing system 10 to transmit to the processor 20 data describing a freeform stroke to be generated and displayed. The memory 30 comprises, for example, any of an optical or magnetic disc, and a semiconductor memory which provides a workspace and storage area for use by the processor 20. The processor 20 comprises, for example, any standard CPU capable of generating points along a centerline curve of the freeform stroke and points along a right and left offset curve, and capable of displaying graphical representations of these points on the display 40. For example, a Motorola 680x0, Intel/IBM R6000, or SPARC can be used as the processor 20. The display 40 comprises, for example, any color or monochrome visual display capable of displaying graphical representations of the points along the centerline curve and the right and left offset curves generated by the processor 20. Likewise, the display 40 can comprise a printing device such as a laser printer or a plotter.

Various embodiments of the operation of the data processing system 10 shown in FIG. 1 will now be described, in detail, with reference to FIGS. 2-7.

First Embodiment

Figure 2:
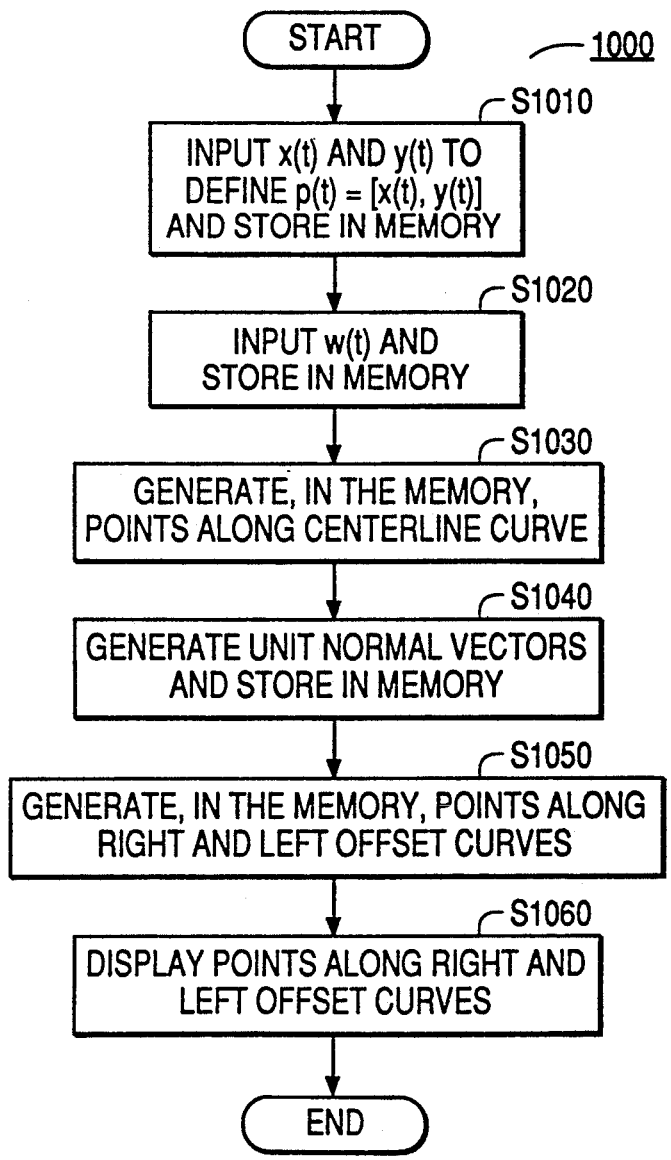
FIG. 2 is a flow diagram illustrating an operation of the data processing system of FIG. 1 in accordance with a first embodiment of the present invention.

As shown in FIG. 2, there is provided a flow diagram 1000 illustrating an operation of the data processing system 10 of FIG. 1 in accordance with a first embodiment of the present invention. The flow diagram 1000 will be explained with reference to both the data processing system 10 of FIG. 1 and the graphical illustrations of FIGS. 3(a)-3(g).

In step S1010, an operator of the data processing system 10 inputs, via the input device 50, a function x(t) and a function y(t) to specify horizontal and vertical coordinates, respectively, associated with each point along a centerline curve p(t) of a freeform curve to be generated and displayed. As will be apparent to those of ordinary skill in the art, the functions x(t) and y(t) are limited only to the extent that they should define a centerline curve p(t) for which there exists a method for generating a normal vector at each point along a desired interval of the centerline curve.

Figure 3A:
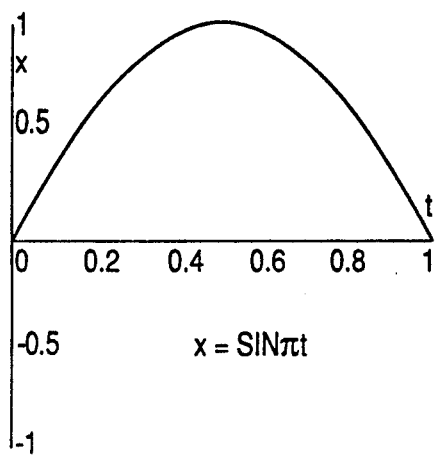
FIGS. 3(a)-3(g) are illustrations relating to the flow diagram of FIG. 2.
Figure 3B:
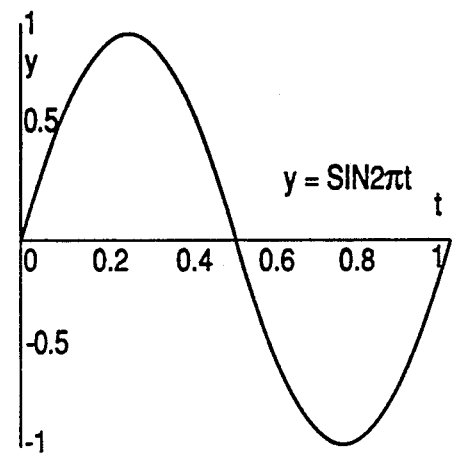
Figure 3C:
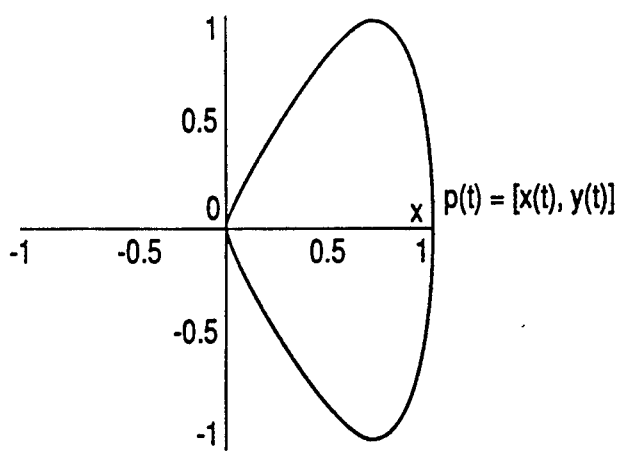

Thus, in the present invention, the centerline curve of the freeform curve to be generated and displayed varies as a function of a parameter t, and each point along the centerline curve is associated with a horizontal coordinate defined by the function x(t), and a vertical coordinate defined by the function y(t). Examples of the functions x(t), y(t), and p(t) are shown in FIGS. 3(a), 3(b), and 3(c), respectively, within the open interval [0,1). As shown in FIGS. 3(a), 3(b), and 3(c), x(t)=sin($\pi$t), y(t)=sin(2$\pi$t), and p(t)=[x(t), y(t)]. It should be understood that, in computer graphics, it is customary to consider parametric cubic curves, such as the centerline curve of the present invention, with the parameter restricted to the interval [0,1). For example, Bezier spline curves are known to be more numerically stable within the interval [0,1) than elsewhere. Accordingly, in the present invention, it may be desirable that the parameter t be restricted to this interval. Further, assuming that the function p(t) is parameterized in the [0,1) interval, it is desirable that the parametric step be no greater than t/2. After completion of step S1010, control passes to step S1020.

Figure 3D:
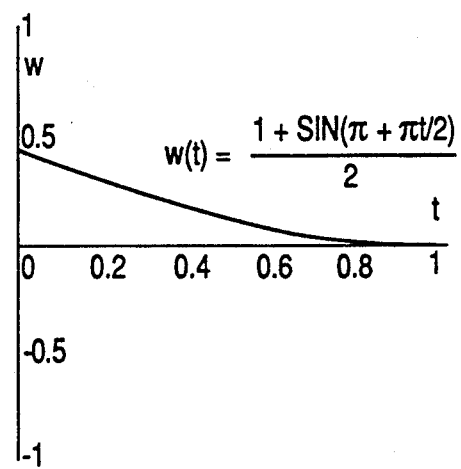

In step S1020, the operator inputs, via the input device 50, a function w(t), which specifies a width associated with each point along the centerline curve p(t). Thus, each point along the centerline curve, in addition to being associated with a horizontal and vertical coordinate, is associated with a width defined by the function w(t). An example of the function w(t) is shown in FIG. 3(d) within the interval [0,1). As shown in FIG. 3(d), w(t)=½[1+sin($\pi$+$\pi$t/2)]. After completion of step S1020 control passes to step S1030.

In step S1030, the processor 20 generates, in the memory 30, points along the centerline curve p(t). In particular, the processor 20 generates, using the functions x(t), y(t), and w(t), horizontal coordinates, vertical coordinates, and widths, respectively, associated with a number of points along the centerline curve p(t) for various values of the parameter t within a desired interval. As discussed above, preferably, the interval is [0,1) and the maximum step size of the parameter t is t/2. The processor 20 then stores the generated coordinates and widths in the memory 30.

Although, theoretically, the processor 20 can generate the coordinates and widths associated with an infinite number of points along the centerline curve, in practice, the coordinates and widths of only a predetermined number of points are required to accurately display the freeform stroke. Preferably, the number of points for which coordinates and widths are generated by the processor 20 can be determined by an operator in accordance with various considerations such as the size of the memory 30, the speed of the processor 20, and the resolution of the display 40. After completion of step S1030, control passes to step S1040.

In step S1040, the processor 20 generates a normal vector associated with each point generated along the centerline curve in step S1030. Preferably, for each value of t within the interval [0,1) for which coordinates and a width have been generated, the processor 20 generates a unit normal vector n(t) expressed as follows:

$$n(t) = \frac{(dy/dt, -dx/dt)}{[(dy/dt)^2 + (dx/dt)^2]^{\frac{1}{2}}} \quad \text{Eqn. 2.0}$$

Figure 3E:
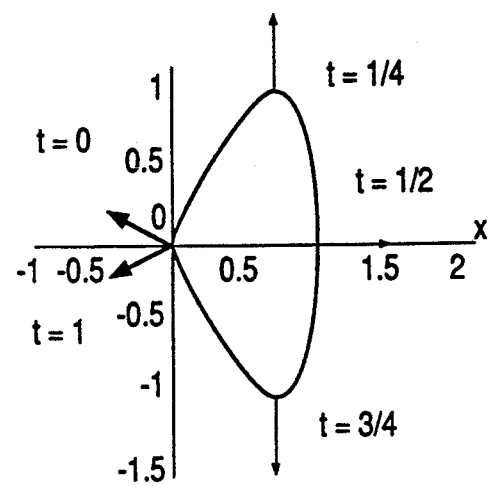

It should be understood from Eqn. 2.0 that the unit normal vector n(t) has both an x component and a y component. Preferably, after each normal vector is generated, it is stored by the processor 20 in the memory 30. Examples of the unit normal vectors n(t) along with the centerline curve p(t) of FIG. 3(c) are shown in FIG. 3(e) for the values t=0, ¼, ½, ¾, and 1. After completion of step S1040, control passes to step S1050.

In step S1050, the processor 20 generates, in the memory 30, points along a right offset curve and a left offset curve for corresponding ones of the points generated along the centerline curve in step S1030. The right and left offset curves vary as a function of the parameter t, and each of the points along the right and left offset curves are associated with a horizontal coordinate and a vertical coordinate generated by the processor 20 in accordance with the horizontal coordinate, vertical coordinate, width, and normal vector associated with the corresponding point along the centerline curve. In particular, the processor 20 generates, using the coordinates, widths, and normal vectors stored in the memory 30, horizontal coordinates and vertical coordinates associated with points along the offset curve for values of the parameter t within the desired interval. The result of this step is a locus of points o(t) defined as follows:

$$o(t)=p(t) \pm w(t)n(t) \quad \text{Eqn. 3.0}$$

Figure 3F:
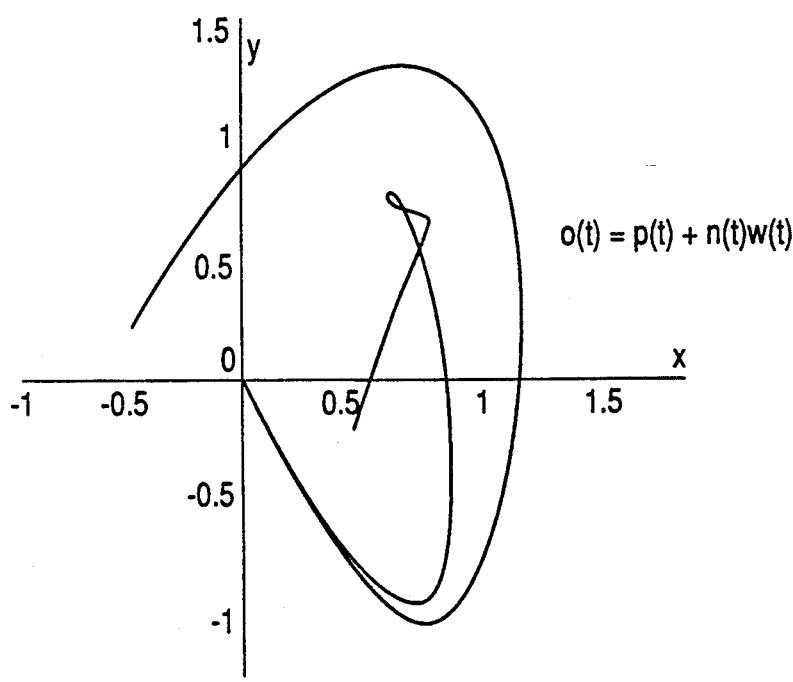
Figure 3G:
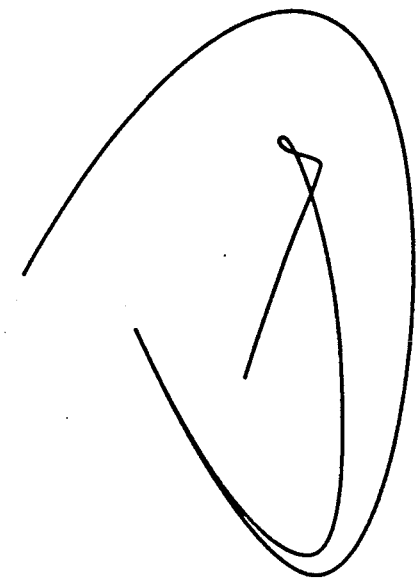

Assuming w(t)>0, points along the right offset curve are given by the negative sign in equation 3.0 and points along the left offset curve are given by the positive sign in equation 3.0. The locus of points o(t) for the function p(t), w(t), and n(t) of FIGS. 3(c)-(e) is shown in FIG. 3(f). After the coordinates associated with each of the points along the offset curves are generated, the processor 20 stores them in the memory 30. After completion of step S1050, control passes to step S1060.

In step S1060, the processor 20 displays, on the display 40, a graphical representation of the points generated along the right and left offset curves in step S1050 to display an outer boundary of the freeform stroke. In particular, the processor 20 reads the coordinates of the points along the offset curves from the memory 30 and controls the display 40 to display points at locations of pixels of the display 40 which correspond to the read coordinates. Various methods of determining the correspondences between the coordinates of the points along the offset curves and the locations of pixels on the display 40 are known to those skilled in the art and, therefore, detailed descriptions of such methods will be omitted. In the example described above with regard to FIGS. 3(a)-3(f), the display 40 displays the image shown in FIG. 3(g).

Second Embodiment

In the second embodiment of the present invention, the centerline curve of the freeform curve is a spline curve and points along the centerline curve are generated using a subdivision technique. In the present invention, a spline curve is a curve whose shape can be defined by a series of control points, as is known to those of ordinary skill in the art. Examples of spline curves are Bezier curves and B-spline curves.

Figure 4:
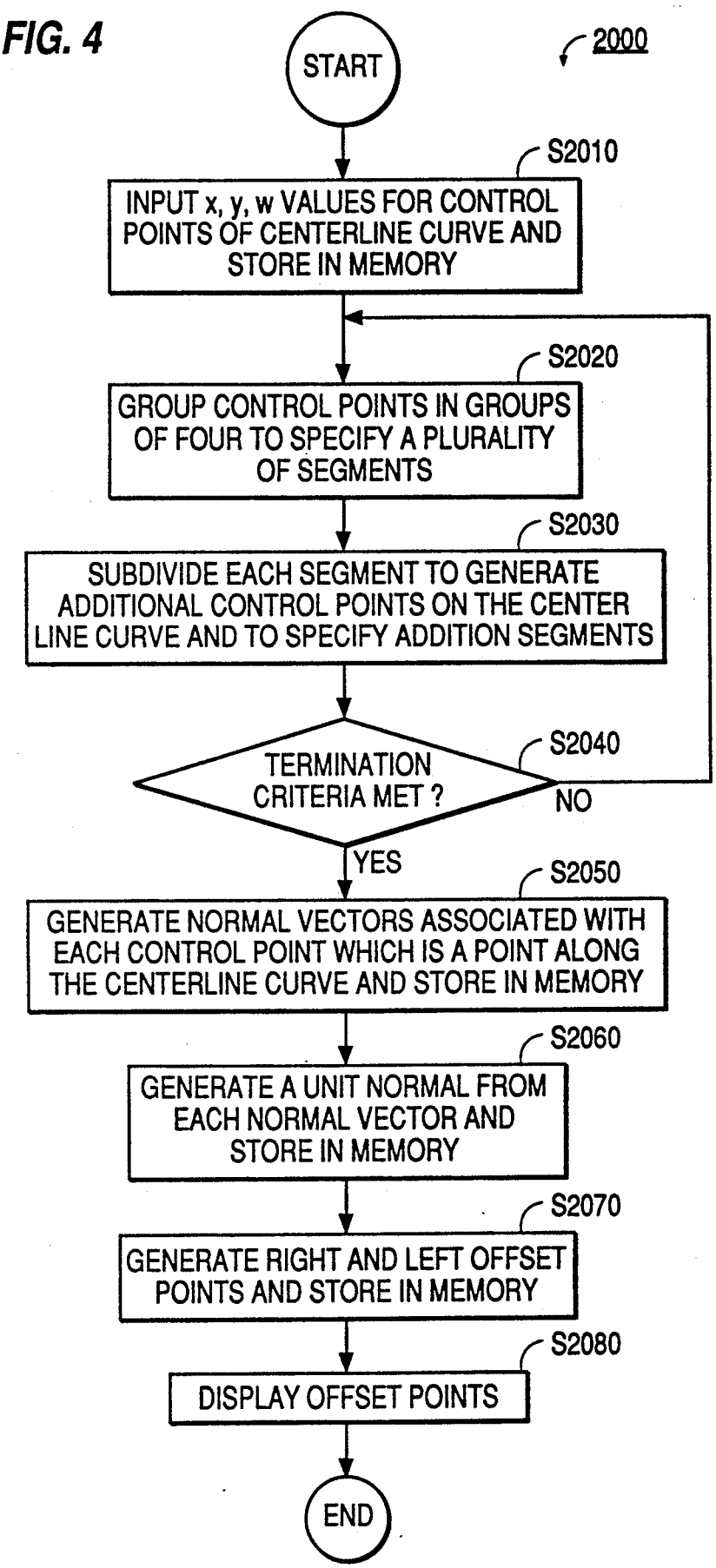
FIG. 4 is a flow diagram illustrating an operation of the data processing system of FIG. 1 in accordance with a second embodiment of the present invention.

As shown in FIG. 4, there is provided a flow diagram 2000 illustrating an operation of the data processing system 10 of FIG. 1 in accordance with the second embodiment of the present invention. The flow diagram 1000 will be explained with reference to both the data processing system 10 of FIG. 1 and the graphical illustrations of FIGS. 5(a)-5(f).

Figure 5A:
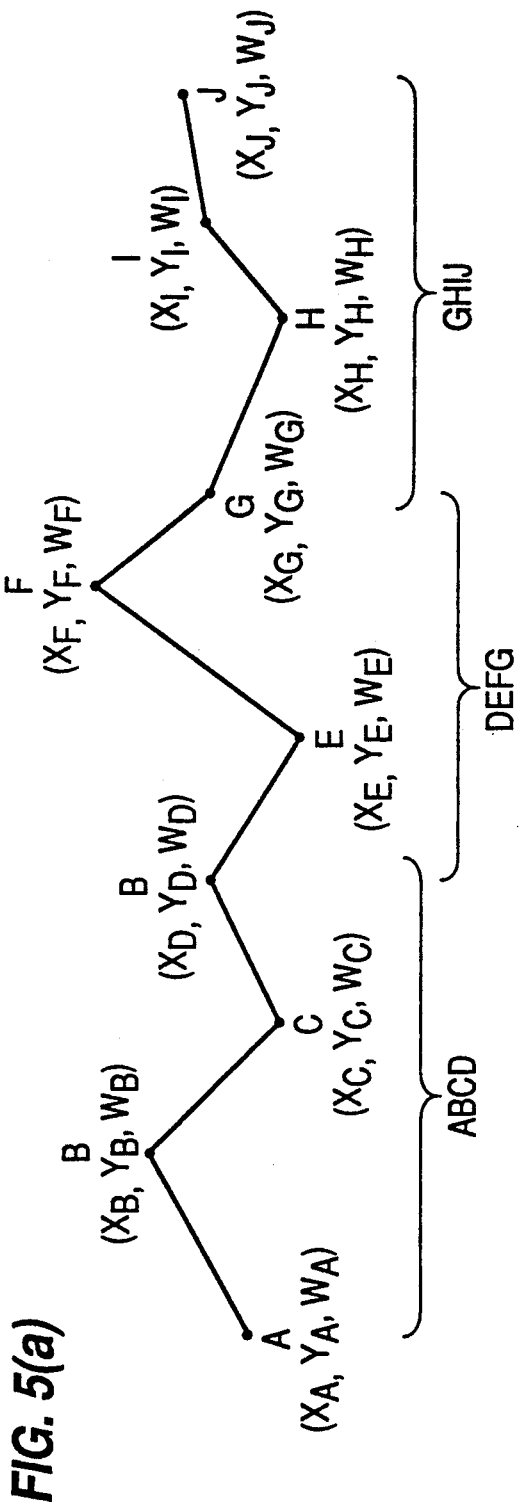
FIGS. 5(a)-5(f) are illustrations relating to the flow diagram of FIG. 4.
Figure 6:
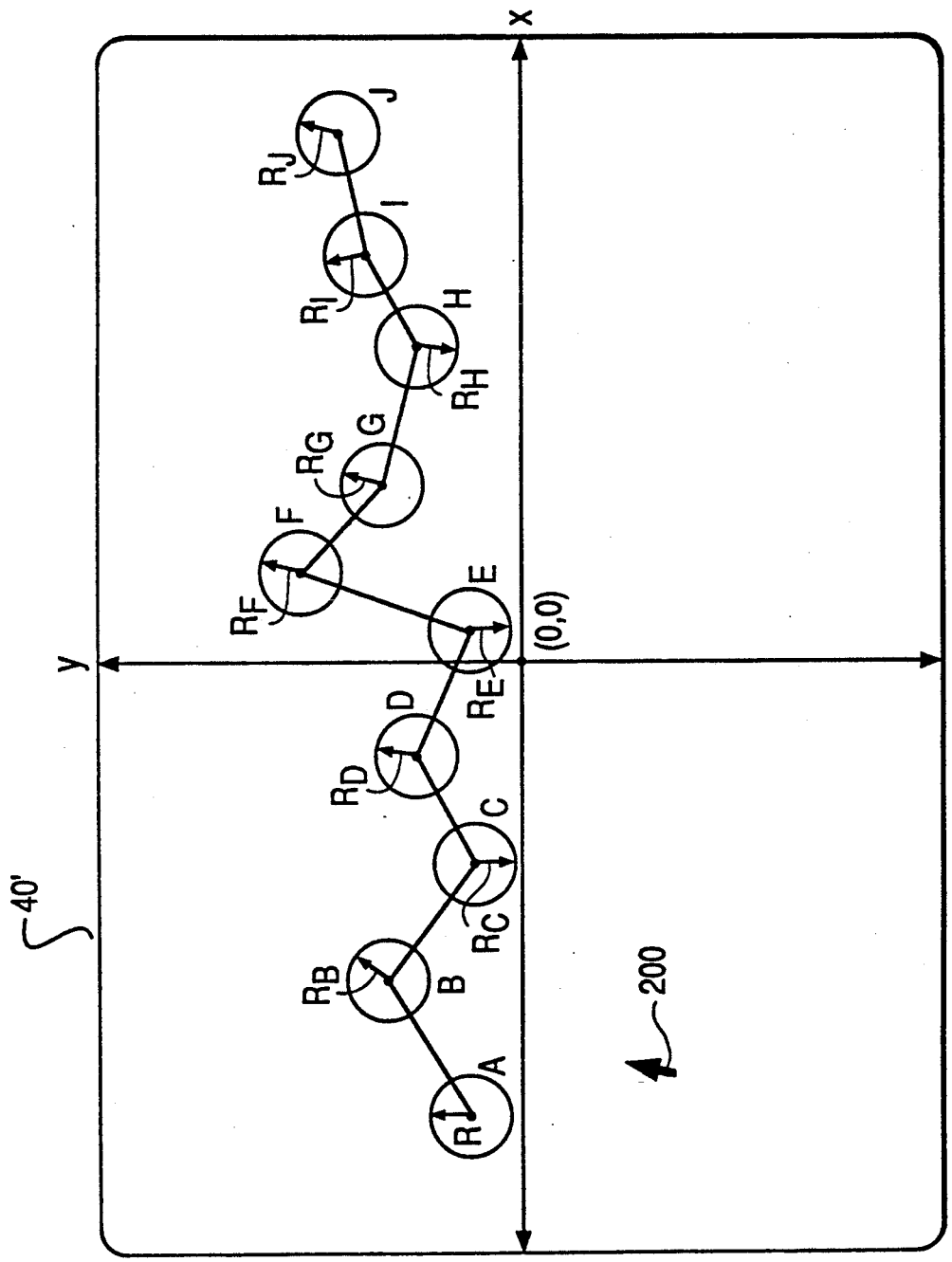
FIG. 6 illustrates a technique for inputting horizontal coordinates, vertical coordinates, and widths associated with control points into the data processing system of FIG. 1.

In step S2010, an operator inputs, via the input device 50, horizontal coordinates, vertical coordinates, and widths associated with a plurality of control points to define the shape of a centerline curve. For the sake of simplicity, it will be assumed that the operator inputs coordinates and widths associated with only ten control points. For example, as shown in FIG. 5(a), the operator inputs horizontal coordinates $x_{A-J}$, vertical coordinates $y_{A-J}$, and widths $w_{A-J}$ for the control points A-J, respectively. The coordinates and widths are stored by the processor 20 in the memory 30. It should be understood that the horizontal coordinates and vertical coordinates associated with the control points correspond to horizontal and vertical positions, respectively, of pixels on the display 40. For instance, as shown in FIG. 6, the location of each pixel on the display 40 is associated with a horizontal coordinate x and a vertical coordinate y corresponding to the respective horizontal coordinates $x_{A-J}$ and vertical coordinates $y_{A-J}$ associated with the control points A-J. Preferably, the center pixel of display 40 is associated with the x and y coordinates (0,0), such that the horizontal coordinates and vertical coordinates associated with the control points may have negative or positive values.

Step S2010 can be performed in many ways. For example, assuming that the input device 50 includes a floppy disk drive, the coordinates and widths associated with each control point can be stored on a floppy disk and input directly to the processor 20 for storage in the memory 30. Alternatively, if the input device 50 includes a keyboard, the operator can type the coordinates and widths, which are read by the processor 20. Preferably, the input device includes a mouse and, as shown in FIG. 6, the operator controls the mouse to move a pointer 200 along the display 40' to a position on the display 40' corresponding to the desired coordinates associated with a control point. To enter the coordinates into the data processing system 10, the operator, for example, "clicks" the mouse, whereupon the control point is displayed on the display 40'. To enter the widths, the present invention provides a circle, having a radius R, centered around each control point, as shown in FIG. 6. The radius R corresponds to the width associated with the respective control point. To set the width associated with a control point, the operator uses the mouse to place the pointer 200 on the perimeter of a circle surrounding the control point. By "pulling" the perimeter of the circle either "in" or "out," the operator can vary the radius R of the circle and, thereby, vary the width associated with the respective control point. Preferably, the width of a control point is automatically stored in the memory 30 by the processor 20 each time the radius R of the corresponding circle is changed. After completion of step S2010, control passes to step S2020.

In step S2020, the processor 20 groups selected ones of the control points to specify a segment. Preferably, the processor 20 groups the control points into groups of four, wherein each group of four control points specifies a segment, and wherein two of the control points of each group specify end points of the segment. It should be understood that a centerline curve can comprise one or more segments connected end-to-end. For example, with regard to FIG. 5(a), the processor 20 groups together control points A-D to specify a segment ABCD having as endpoints control points A and D, groups together control points D-G to specify a segment DEFG having as endpoints control points D and G, and groups together control points G-J to specify a segment GHIJ having as endpoints control points G and J. It should be understood from FIG. 5(a) that the processor 20, preferably, groups the control points A-J such that adjacent segments share a con, non endpoint. It should also be understood that the endpoints of each segment are actually points along the centerline curve.

In step S2030, the processor 20 subdivides each of the segments specified in step S2020 to specify additional control points, one of which is a point along the centerline curve. In particular, each time the processor 20 subdivides a segment, it specifies two additional segments and generates an additional control point, wherein the additional control point is a point along the centerline curve. The details of step S2030 will now be explained with reference to a flow diagram 3000 illustrated FIG. 7. For the sake of simplicity, only subdivision of segment ABCD shown in FIG. 5(b) will be described. It should be understood, however, that the processor 20 also subdivides segments DEFG and GHIJ either subsequent to, prior to, or simultaneously with the subdivision of segment ABCD.

Figure 7:
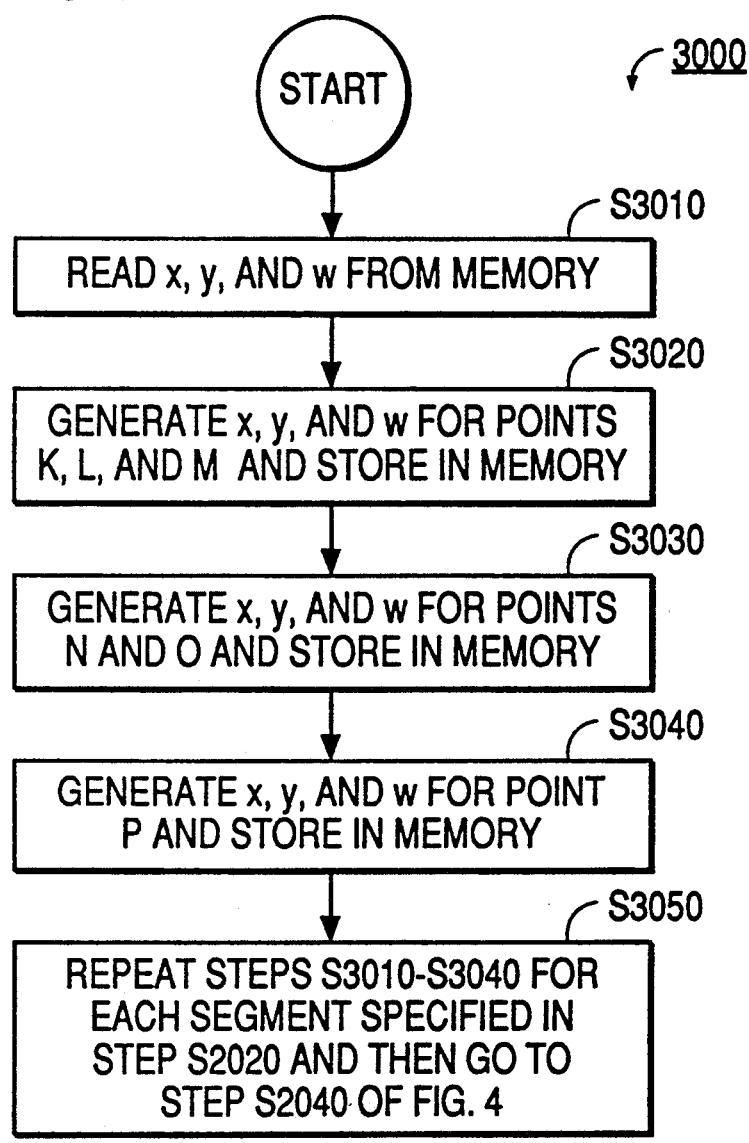
FIG. 7 is a flow diagram illustrating an example of the subdivision technique of the flow diagram of FIG. 4.

As shogun in FIG. 7, in step S3010, the processor 20 reads from the memory 30, the horizontal coordinate, vertical coordinate, and width associated with each of the control points A, B, C, and D.

In step S3020, the processor 20 generates a horizontal coordinate $x_K$, vertical coordinate $y_K$, and width $w_K$ associated with a point K located at a midpoint between control points A and B, as follows:

$$x_K = \frac{x_A + x_B}{2} \qquad \text{Eqn. 4.0}$$

$$y_K = \frac{y_A + y_B}{2} \qquad \text{Eqn. 4.1}$$

$$w_K = \frac{w_A + w_B}{2} \qquad \text{Eqn. 4.2}$$

Also in step S3020, the processor 20 generates a horizontal coordinate $x_L$, vertical coordinate $y_L$, and width $w_L$ associated with a point L located at a midpoint between control points B and C, as follows:

$$x_L = \frac{x_B + x_C}{2} \qquad \text{Eqn. 4.3}$$

$$y_L = \frac{y_B + y_C}{2} \qquad \text{Eqn. 4.4}$$

$$w_L = \frac{w_B + w_C}{2} \qquad \text{Eqn. 4.5}$$

In step S3020, the processor 20 further generates a horizontal coordinate $x_M$, vertical coordinate $y_M$, and width $w_M$ associated with a point M located at a midpoint between control points C and D, as follows:

$$x_M = \frac{x_C + x_D}{2} \qquad \text{Eqn. 4.6}$$

$$y_M = \frac{y_C + y_D}{2} \qquad \text{Eqn. 4.7}$$

$$w_M = \frac{w_C + w_D}{2} \qquad \text{Eqn. 4.8}$$

Figure 5C:
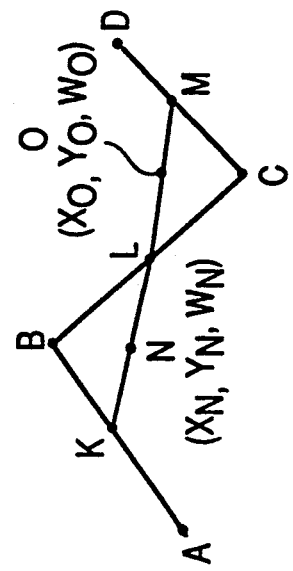
Figure 5B:
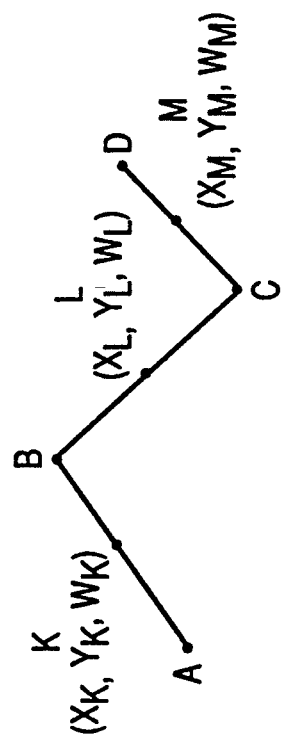

The points K, L, and M are shown graphically in FIG. 5(b). After completion of step S3020, control passes to step S3030.

In step S3030, the processor 20 generates a horizontal coordinate $x_N$, vertical coordinate $y_N$, and width $w_N$ associated with a point N located at a midpoint between points K and L, as follows:

$$x_N = \frac{x_K + x_L}{2} \qquad \text{Eqn. 5.0}$$

$$y_N = \frac{y_K + y_L}{2} \qquad \text{Eqn. 5.1}$$

$$w_N = \frac{w_K + w_L}{2} \qquad \text{Eqn. 5.2}$$

Also in step S3030, the processor 20 generates a horizontal coordinate $x_O$, vertical coordinate $y_O$, and width $w_O$ associated with a point O located at a midpoint between points L and M, as follows:

$$x_O = \frac{x_L + x_M}{2} \qquad \text{Eqn. 5.3}$$

$$y_O = \frac{y_L + y_M}{2} \qquad \text{Eqn. 5.4}$$

$$w_O = \frac{w_L + w_M}{2} \qquad \text{Eqn. 5.5}$$

The points N and O are shown graphically in FIG. 5(c). After completion of step S3030, control passes to step S3040.

In step S3040, the processor 20 generates a horizontal coordinate $x_P$, vertical coordinate $y_P$, and width $w_P$ associated with a point P located at a midpoint between points N and O, as follows:

$$x_P = \frac{x_N + x_O}{2} \qquad \text{Eqn. 6.1}$$

-continued $$x_P = \frac{y_N + y_O}{2} \qquad \text{Eqn. 6.2}$$

$$w_P = \frac{w_N + w_O}{2} \qquad \text{Eqn. 6.3}$$

Figure 5D:
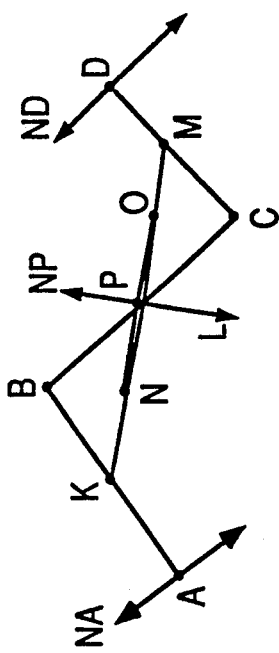

The point P is shown graphically in FIG. 5(d). The processor 20 then stores the horizontal coordinate, vertical coordinate, and width associated with point P in the memory 30. As shown in FIG. 5(d), the above-described subdivision technique results in five additional control points, namely, points K, N, P, 0, and M, wherein additional control point P is a point along the centerline curve. As is also shown in FIG. 5(d), the above-described subdivision technique results in two additional segments, namely, segment AKNP and segment POMD, each having as endpoints control points A and P and control points P and D, respectively. Upon completion of step S3040, control passes to step S3050.

In step S3050, steps S3010–S3040 are performed by the processor 20 on each of the segments specified by the processor 20 in step S2030 of FIG. 4. It should be understood that steps S3010–S3050 of FIG. 7 constitute one "pass" of the subdivision technique of the second embodiment of the present invention. Thus, one pass of the subdivision technique, when performed on the segments of FIG. 7, results in fifteen additional control points, three of which are points along the centerline curve. Upon completion of step S3050 of FIG. 7, control passes to step S2040 of FIG. 4.

In step S2040, the processor 20 performs a termination test to determine whether certain predetermined termination criteria have been met. In particular, the processor 20 determines whether a selected number of control points, which are points along the centerline curve, have been generated. The selected number of control points depends upon the accuracy with which an operator wishes to generate the centerline curve. The more points along the centerline curve that are generated, the more accurate the curve. Although various methods exist for determining whether a sufficient number of points along the centerline curve have been generated, in the second embodiment of the present invention, the processor 20 determines the degree with which each additional segment produced in step S2030 approximates a straight line, and then determines the degree with which the widths associated with each control point of an addition segment are constant or approximate a linear function. If the processor 20 determines that each additional segment approximates a straight line and that the widths associated with each control point of the additional segments are constant or approximate a linear function, with a desired degree of accuracy, then control passes to step S2050. Otherwise, control returns to step S2020, wherein the processor 20 groups the additional control points into groups of four to specify a plurality of additional segments which are then further subdivided, as described above with regard to the original segments, to produce even more control points which are points along the centerline curve. It should be understood that, although FIG. 4 shows that the termination test is performed after each pass of the subdivision technique, the subdivision test can, alternatively, be performed after completion of any one of the subsequent steps in the flow diagram 2000.

In step S2050 of FIG. 4, the processor 20 generates a normal vector associated with each of the points generated along the centerline curve in the previous steps. For example, after subdividing the segment ABCD, the processor 20 generates normal vectors $N_A$, $N_P$, and $N_D$ associated with the control points A, P, and D, respectively, as follows:

$$N_A = [N_{Ax}, N_{Ay}] = [(x_K - x_A), -(y_K - y_A)] \qquad \text{Eqn. 7.0}$$

$$N_P = [N_{Px}, N_{Py}] = [(x_P - x_N), -(y_P - y_N)] \qquad \text{Eqn. 7.1}$$

$$N_D = [N_{Dx}, N_{Dy}] = [(x_D - x_M), -(y_D - y_M)] \qquad \text{Eqn. 7.2}$$

Figure 5E:
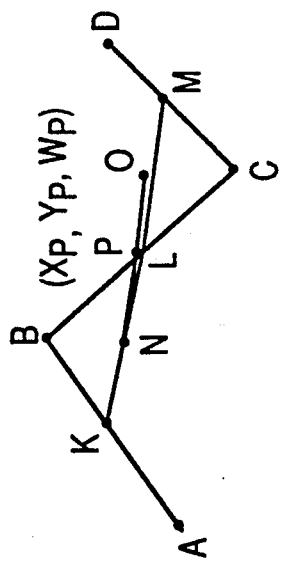

The normal vectors $N_A$, $N_P$, and $N_D$ are graphically illustrated in FIG. 5(e). After completion of step S2050, control passes to step S2060.

In step S2060, the processor 20 normalizes each of the normal vectors generated in step S2040 to produce corresponding unit normal vectors. For example, after generating the normal vectors $N_A$, $N_P$, and $N_D$, the processor 20 produces unit normal vectors $n_A$, $n_P$, and $n_D$, as follows:

$$n_A = [n_{Ax}, n_{Ay}] = \frac{(x_K - x_A), -(y_K - y_A)}{\{[-(y_K - y_A)]^2 + [(x_K - x_A)]^2\}^{\frac{1}{2}}} \qquad \text{Eqn. 8.0}$$

$$n_P = [n_{Px}, n_{Py}] = \frac{(x_P - x_N), -(y_P - y_N)}{\{[-(y_P - y_N)]^2 + [(x_P - x_N)]^2\}^{\frac{1}{2}}} \qquad \text{Eqn. 8.1}$$

$$n_A = [n_{Dx}, n_{Dy}] = \frac{(x_D - x_M), -(y_D - y_M)}{\{[-(y_D - y_M)]^2 + [(x_D - x_M)]^2\}^{\frac{1}{2}}} \qquad \text{Eqn. 8.2}$$

It should be understood from Eqns. 7.0-8.2 that the normal vectors and unit normal vectors each have an x component and a y component. Upon completion of step S2060, control then passes to step S2070.

In step S2070, the processor 20 generates, in the memory 30, points along a right offset curve and a left offset curve for corresponding ones of the points generated along the centerline curve. The right and left offset curves vary as a function of the parameter t, and each of the points along the right and left offset curves are associated with a horizontal coordinate and a vertical coordinate generated, by the processor 20, in accordance with the horizontal coordinate, vertical coordinate, width, and unit normal vector associated with the corresponding point generated along the centerline curve. Specifically, each point along the right and left offset curves lies a distance w from a corresponding point along the centerline curve in the direction parallel to the unit normal vector associated with the corresponding point along the centerline curve. For example, after generating the unit normal vectors $n_A$, $n_P$, and $n_D$, the processor 20 generates a right offset point $RO_A$ and a left offset point $LO_A$ corresponding to the control point A, wherein the right offset point $RO_A$ is associated with a horizontal coordinate $x_{ROA}$ and a vertical coordinate $y_{ROA}$, and wherein the left offset point $LO_A$ is associated with a horizontal coordinate $x_{LOA}$ and a vertical coordinate $y_{LOA}$, as follows:

$$x_{ROA} = x_A + (n_{Ax})(W_A) \qquad \text{Eqn. 9.0}$$

$$y_{ROA} = y_A + (n_{Ay})(W_A) \qquad \text{Eqn. 9.1}$$

$$x_{LOA} = x_A - (n_{Ax})(W_A) \qquad \text{Eqn. 9.2}$$

$$y_{LOA} = y_A - (n_{Ay})(W_A) \qquad \text{Eqn. 9.3}$$

Likewise, the processor 20 generates a right offset point $RO_P$ and a left offset point $LO_P$ corresponding to the control point P, wherein the right offset point $RO_P$ is associated with a horizontal coordinate $x_{ROP}$ and a vertical coordinate $y_{ROP}$, and wherein the left offset point $LO_P$ is associated with a horizontal coordinate $x_{LOP}$ and a vertical coordinate $y_{LOP}$, as follows:

$$x_{ROP} = x_P + (n_{Px})(w_P) \qquad \text{Eqn. 10.0}$$

$$y_{ROP} = y_P + (n_{Py})(w_P) \qquad \text{Eqn. 10.1}$$

$$x_{LOP} = x_P - (n_{Px})(w_P) \qquad \text{Eqn. 10.2}$$

$$y_{LOP} = y_P - (n_{Py})(w_P) \qquad \text{Eqn. 10.3}$$

Still further, the processor 20 generates a right offset point $RO_D$ and a left offset point $LO_D$ corresponding to the control point D, wherein the right offset point $RO_D$ is associated with a horizontal coordinate $x_{ROD}$ and a vertical coordinate $y_{ROD}$, and wherein the left offset point $LO_D$ is associated with a horizontal coordinate $x_{LOD}$ and a vertical coordinate $y_{LOD}$, as follows:

$$x_{ROD} = x_D + (n_{Dx})(w_D) \qquad \text{Eqn. 11.0}$$

$$y_{ROD} = y_D + (n_{Dy})(w_D) \qquad \text{Eqn. 11.1}$$

$$x_{LOD} = x_D - (n_{Dx})(w_D) \qquad \text{Eqn. 11.2}$$

$$y_{LOD} = y_D - (n_{Dy})(w_D) \qquad \text{Eqn. 11.3}$$

Figure 5F:
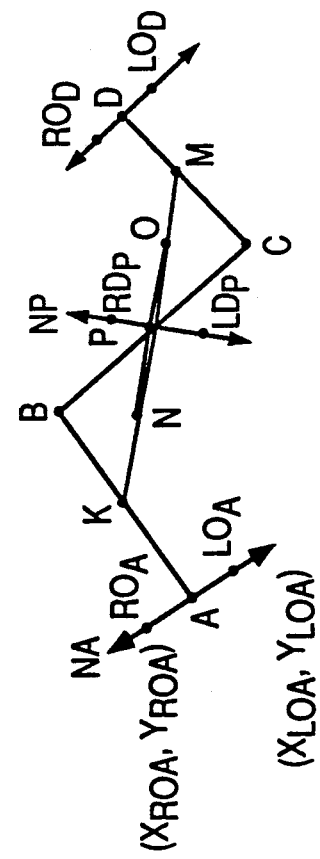

The right and left offset points corresponding to control points A, P, and D are graphically illustrated in FIG. 5(f). The horizontal coordinates and the vertical coordinates associated with each offset point are stored by the processor 20 in the memory 30. Upon completion of step S2070, control then passes to step S2080.

In step S2080, the processor 20 displays, on the display 40, graphical representations of the points generated along the right and left offset curves during step S2070 to display an outer boundary of the freeform stroke. In particular, the processor 20 reads the horizontal and vertical coordinates associated with each point generated along the right and left offset curves and stored in the memory 30, and controls the display 40 to display points at locations on the display 40 which correspond to the horizontal and vertical coordinates. It should be noted that corresponding right and left offset points are displayed at distances from each other determined by the width associated with the corresponding point along the centerline curve. The resulting display is an outline of the freeform stroke.

Although the second embodiment has been described with regard to one specific subdivision technique, various other subdivision techniques known to those skilled in the art are also applicable to the present invention, as long as the width associated with each control point varies in the same parameter as the vertical and horizontal coordinates associated with the control point.

Additional advantages and modifications of the present invention will readily occur to those skilled in the art. For example, the data processing system 10 of FIG. 1 can be replaced by a hardware system such as the hardware system 100 shown in FIG. 8.

Figure 8:
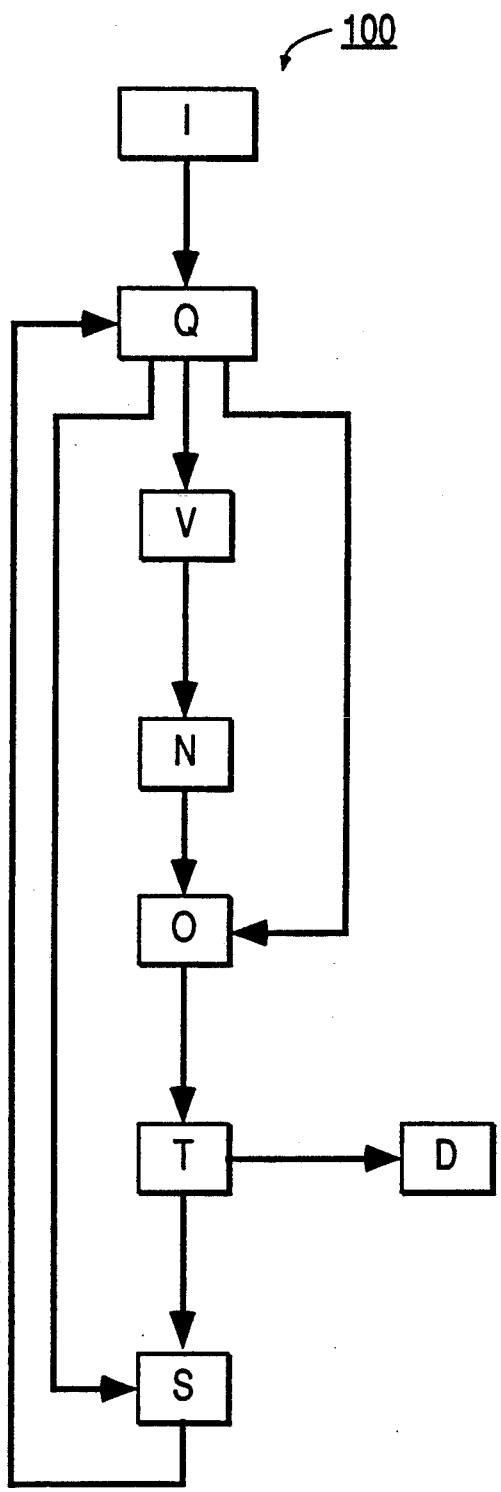
FIG. 8 is a block diagram illustrating a hardware system for generating and displaying a freeform curve in accordance with the present invention.

As shown in FIG. 8, the hardware system 100 comprises an input device I and a line drawing unit D which, preferably, perform equivalent functions as the input device 50 and display 40, respectively, of the data processing system 10 of FIG. 1. As also shown in FIG.

8, however, the processor 20 and memory 30 of the data processing system 10 of FIG. 1 are replaced with a segment queue controller Q, a normal vector generator V, a normalizer N, an offset generator O, a termination tester T, and a subdivider S.

Control points are fed to the segment queue controller Q, which then sends them, one segment at a time, to the normal vector generator V and to the offset generator O. The normal vector generator V transmits normal vectors to the vector normalizer N, which transmits normalized vectors to the offset generator O. Offset generator O scales the normalized normal vectors received from the vector normalizer N by the w components of the control points received from the segment queue controller Q, and adds them, componentwise, to the x and y components of the control points received from the segment queue controller Q. 0 then transmits the offset points to the termination tester T, along with the normalized normal vectors. The termination tester T uses the normalized normal vectors and offset points to determine whether to send one or more drawing commands to the line drawing unit D and whether or not to signal the subdivider S to perform a subdivision. The subdivider S subdivides the control points and, if it receives the necessary command from the termination tester T, transmits them back to the segment queue controller Q for further processing. It should be noted that with appropriate timing controls, several segments could be in the pipeline at any given time.

The details of each of the elements of FIG. 8 are known by those skilled in the art. For example, the segment queue controller can comprise an up/down counter and a suitably wired array of memory. The counter generates addresses in memory in a stack-like fashion (always up or down one from the previous address generated). The normal vector generator V requires one or more adders to perform subtractions. The vector normalizer N requires a square root extractor and a multiplier. These are found in the design of typical floating point coprocessors, such as the one found in the Motorola 680x0 series. Further, preferably, the offset generator O contains one or more adders, the termination tester T contains some adders and condition testing logic, the subdivider S contains one or more adders and wiring to perform divisions by two using shifts, and the drawing unit D is a standard line drawing unit.

Thus, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method of generating a freeform stroke, the method comprising the steps of:
    generating points along a centerline curve of the freeform stroke, said centerline curve varying as a function of a parameter t, and each of said points along said centerline curve being associated with a horizontal coordinate defined by a function x(t), a vertical coordinate defined by a function y(t), and a width defined by a function w(t);
    generating a normal vector associated with each of said points along said centerline curve; and
    generating points along a right offset curve and a left offset curve for corresponding ones of the points along said centerline curve, said right and left offset curves defining an outer boundary of said freeform stroke and varying as a function of said parameter t, and each of said points along said right and left offset curves being associated with a horizontal offset coordinate and a vertical offset coordinate, generated in accordance with the horizontal coordinate, vertical coordinate, width, and normal vector associated with the corresponding point along said centerline curve.

2. A method of generating and displaying a freeform stroke, the method being performed by a data processing system having a memory and a display, and the method comprising the steps of:
    generating, in the memory, points along a centerline curve of the freeform stroke, said centerline curve varying as a function of a parameter t, and each of said points along said centerline curve being associated with a horizontal coordinate defined by a function x(t), a vertical coordinate defined by a function y(t), and a width defined by a function w(t);
    generating a normal vector associated with each of said points along said centerline curve;
    generating, in the memory, points along a right offset curve and a left offset curve for corresponding ones of the points along said centerline curve, said right and left offset curves defining an outer boundary of said freeform stroke and varying as a function of said parameter t, and each of said points along said right and left offset curves being associated with a horizontal offset coordinate and a vertical offset, coordinate generated in accordance with the horizontal coordinate, vertical coordinate, width, and normal vector associated with the corresponding point along said centerline curve; and
    displaying, on the display, graphical representations of said points along said right and left offset curves to display the outer boundary of the freeform stroke.

3. The method of claim 2, wherein said centerline curve is a spline curve, and wherein the step of generating said points along said centerline curve includes the step of generating said points along said centerline curve using a subdivision technique.

4. The method of claim 3, wherein the step of generating said points along said centerline curve using a subdivision technique includes the steps of:
    specifying a plurality of control points to define a shape of said centerline curve, each of said control points being associated with a horizontal coordinate, a vertical coordinate, and a width;
    grouping selected ones of said plurality of control points to specify a segment, two of said control points which specify said segment being endpoints of said segment, said endpoints being points along said centerline curve; and
    subdividing said segment to specify a plurality of additional control points, one of said additional control points being a point along said centerline curve.

5. The method of claim 4, wherein the step of subdividing said segment includes repeatedly, until predetermined termination criteria have been met, performing the steps of:
    grouping selected ones of said additional control points to specify additional segments; and
    subdividing said additional segments to specify a plurality of additional control points, one of said additional control points being a point along said centerline curve.

6. The method of claim 5, including the step of performing a termination test to determine whether said predetermined termination criteria have been met, said predetermined termination criteria indicating that a predetermined number of said points along said centerline curve have been generated.

7. The method of claim 6, wherein the step of performing said termination test includes the steps of:
   determining whether said segments approximate a straight line; and
   determining whether w(t) is a constant or approximates a linear function, said predetermined termination criteria being met if said segments approximate a straight line, and if w(t) is a constant or approximates a linear function.

8. An apparatus for generating a freeform stroke, the apparatus comprising:
   means for generating points along a centerline curve of the freeform stroke, said centerline curve varying as a function of a parameter t, and each of said points along said centerline curve being associated with a horizontal coordinate defined by a function x(t), a vertical coordinate defined by a function y(t), and a width defined by a function w(t);
   means for generating a normal vector associated with each of said points along said centerline curve; and
   means for generating points along a right offset curve and a left offset curve for corresponding ones of the points along said centerline curve, said right and left offset curves defining an outer boundary of said freeform stroke and varying as a function of said parameter t, and each of said points along said right and left offset curves being associated with a horizontal offset coordinate and a vertical offset coordinate generated in accordance with the horizontal coordinate, vertical coordinate, width, and normal vector associated with the corresponding point along said centerline curve.

9. An apparatus for generating and displaying a freeform stroke, the apparatus comprising:
   means for generating points along a centerline curve of the freeform stroke, said centerline curve varying as a function of a parameter t, and each of said points along said centerline curve being associated with a horizontal coordinate defined by a function x(t), a vertical coordinate defined by a function y(t), and a width defined by a function w(t);
   means for generating a normal vector associated with each of said points along said centerline curve;
   means for generating points along a right offset curve and a left offset curve for corresponding ones of the points along said centerline curve, said right and left offset curves defining an outer boundary of said freeform stroke and varying as a function of said parameter t, and each of said points along said right and left offset curves being associated with a horizontal offset coordinate and a vertical offset coordinate generated in accordance with the horizontal coordinate, vertical coordinate, width, and normal vector associated with the corresponding point along said centerline curve; and
   means for displaying graphical representations of said points along said right and left offset curves to display the outer boundary of the freeform stroke.

10. The apparatus of claim 9, wherein said centerline curve is a spline curve, and wherein said means for generating said points along said centerline curve includes means for generating said points along said centerline curve using a subdivision technique.

11. The apparatus of claim 10, wherein said means for generating said points along said centerline curve using a subdivision technique includes:
   means for specifying a plurality of control points to define a shape of said centerline curve, each of said control points being associated with a horizontal coordinate, a vertical coordinate, and a width;
   means for grouping selected ones of said plurality of control points to specify a segment, two of said control points which specify said segment being endpoints of said segment, said endpoints being points along said centerline curve; and
   means for subdividing said segment to specify a plurality of additional control points, one of said additional control points being a point along said centerline curve.

12. The apparatus claim 11, wherein said means for subdividing said segment includes means for repeatedly, until predetermined termination criteria have been met,
   grouping selected ones of said additional control points to specify additional segments, and
   subdividing said additional segments to specify a plurality of additional control points, one of said additional control points being a point along said centerline curve.

13. The apparatus of claim 12, including means for performing a termination test to determine whether said predetermined termination criteria have been met, said predetermined termination criteria indicating that a predetermined number of said points along said centerline curve have been generated.

14. The apparatus of claim 12, wherein said means for performing said termination test includes:
   means for determining whether said segments approximate a straight line; and
   means for determining whether w(t) is a constant or approximates a linear function, said predetermined termination criteria being met if said segments approximate a straight line, and if w(t) is a constant or approximates a linear function.

* * * * *